United States Patent [19]
Kobayashi

[11] Patent Number: 5,726,732
[45] Date of Patent: Mar. 10, 1998

[54] STRUCTURE FOR COUPLING SOME SELECTED PARTS OF A PAIR OF EYEGLASSES

[76] Inventor: Mitsuo Kobayashi, 6-9 Ebata-cho, Fukui-shi, Fukui-ken, 918, Japan

[21] Appl. No.: 773,721

[22] Filed: Dec. 24, 1996

[30] Foreign Application Priority Data

Oct. 8, 1996 [JP] Japan ................................. 8-267011

[51] Int. Cl.$^6$ ........................................................ G02C 1/08
[52] U.S. Cl. ................................... 351/97; 351/90; 351/99
[58] Field of Search ................................. 351/96, 90, 91, 351/92, 93, 98, 99, 41

[56] References Cited

U.S. PATENT DOCUMENTS 5,500,694  3/1996  Roever et al. ............................. 351/97

*Primary Examiner*—Hung X. Dang
*Attorney, Agent, or Firm*—Nikaido, Marmelstein, Murray & Oram LLP

[57] ABSTRACT

Disclosed is an improved structure for coupling some selected parts of a pair of glasses, particularly for fixing a lens to an associated rim and at the same time, the rim to the joint piece, to which one or the other temple is hinged. The rim has a loop hole at its outer side, dividing the rim circumference into upper and lower rim halves. The rim has two broach sections fixed to the opposite ends of the upper and lower rim halves, and the joint piece has a hollow coupler member to permit the broach sections to be press-fitted therein, thereby holding the lens inside the rim. Two catch pins are fixed to the inner sides of the adjoining rims. These catch pins are inserted into the lateral holes of the opposite ends of the bridge, thus detachably connecting the bridge to the adjoining rims.

5 Claims, 4 Drawing Sheets

5,726,732

STRUCTURE FOR COUPLING SOME SELECTED PARTS OF A PAIR OF EYEGLASSES

BACKGROUND OF THE INVENTION

1. Field of the Invention

The present invention relates to an improvement in or relating to a structure for coupling some selected parts of a pair of eyeglasses, particularly such a coupling structure which permits the assembling of the lens and associated rim and temple, and the bridge and the adjoining rims without using screws.

2. Description of Related Art

FIG. 12 shows a conventional coupling structure in which: the rim 15 has a loop hole at its outer side, dividing the rim circumference into upper and lower rim halves; and the rim has two broach sections 14 fixed to the opposite ends of the upper and lower rim halves. As shown, these broach sections are integrally connected to each other by driving a screw 16 in the tapped holes of the broach sections.

Disadvantageously the driving of the screw into the tapped holes of the broach sections 14 is no easy work, and even though the screw 16 has been tightened, the screw 16 is liable to be loosen so that the lens 4 is allowed to drop off from the rim 15 while the eyeglasses is used.

Such screw tightening work is effected at a retail shop. After trimming and finishing a lens into a required size and shape a shopkeeper drives a screw in the tapped holes of the adjoining broach sections 14 of the rim 15, which surrounds the so trimmed lens 4. Screws are easy to be broken, and on such an occasion the shopkeeper cannot handle the untightened rim.

SUMMARY OF THE INVENTION

In view of the above one object of the present invention is to provide an eyeglasses parts coupling structure for fixing a lens to an associated rim and at the same time, the rim to the joint piece, to which one or the other temple is hinged, without using screws.

To attain this object according to the present invention provided is an eyeglasses parts coupling structure for fixing a lens to an associated rim and at the same time, the rim to the joint piece, to which one or the other temple is hinged, the rim having a loop hole at its outer side, thus dividing the rim circumference into upper and lower halves, and the rim having two broach sections fixed to the opposite ends of the upper and lower halves, and the joint piece having a hollow joint to permit the broach sections to be press-fitted therein, thereby holding the lens inside the rim.

The broach sections and/or the joint piece may have anti-decoupling means in the form of slots or holes made on their circumferences in confronting relation, in which slots or holes ring means is press-fitted to joint together.

The broach sections and the joint piece may be in such a form that their relative rotation may be prevented.

Another object of the present invention is to provide an eyeglasses parts coupling structure for fixing a bridge to the adjoining rims, thus making up a front without using screws.

To attain this object according to the present invention provided is an eyeglasses parts coupling structure including two catch pins fixed to the inner sides of the adjoining rims for inserting into the lateral holes of the opposite ends of the bridge, thus detachably connecting the bridge to the adjoining rims.

Each end of the bridge may have two through holes aligned on the line traversing the lateral hole.

Other objects and advantages of the present invention will be understood from the following description of coupling structures according to preferred embodiments of the present invention, which are shown in accompanying drawings.

DESCRIPTION OF THE PREFERRED EMBODIMENTS

Figure 1:
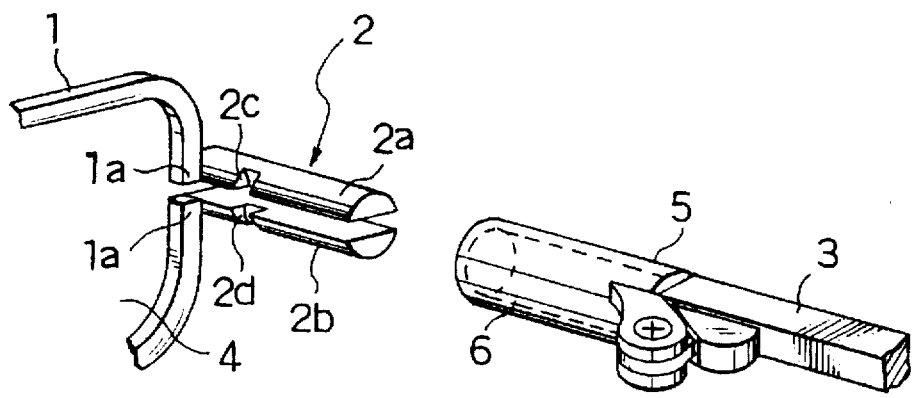
FIG. 1 illustrates a coupling structure for coupling the split broach to an associated temple according to a first embodiment.

Referring to FIG. 1, a coupling structure according to the first embodiment is designed for fixing a lens 4 to an associated rim 1 and at the same time, the rim 1 to the joint piece 5, to which one or the other temple 3 is hinged. The rim 1 is made of a nickel or titanium alloy, and the rim 1 has a loop hole at its outer side as indicated by 1a and 1a, thus dividing the rim circumference into upper and lower halves to permit the lens 4 to be attached detachably to the rim 4. The rim 1 has two broach sections 2a and 2b integrally connected to the opposite ends 1a and 1a of the upper and lower rim halves. The broach sections 2a and 2b are semicylindrical, and are made of a nickel or titanium alloy. The lens 4 can be stably fixed to the rim 1 by jointing these semicylindrical broach sections 2a and 2b together with their flat sides facing on each other.

A coupler member 6 is a hollow metal cylinder, and is press-fitted or crimped on the joint piece 5.

The broach sections 2a and 2b may have recesses 2c and 2d made on inner longitudinal edges, and the hollow metal cylinder 6 may have catch projections (not shown) formed inside to catch the recesses 2c and 2d of the broach sections 2a and 2b, thereby preventing the decoupling of the broach sections 2a and 2b from the hollow metal cylinder 6.

The lens 4 can be fixed to the rim 1 simply by inserting the broach sections 2a and 2b into the hollow metal cylinder 6 until the recesses 2c and 2d are caught by the projections therein. When the lens 4 is removed from the rim 1, the rim 4 and the temple 3 are rotated in the opposite directions until the projections are allowed to come out of the recesses 2c and 2d. Thank to use of no screws the coupling and decoupling work can be easily performed without using any tools.

Figure 2A:
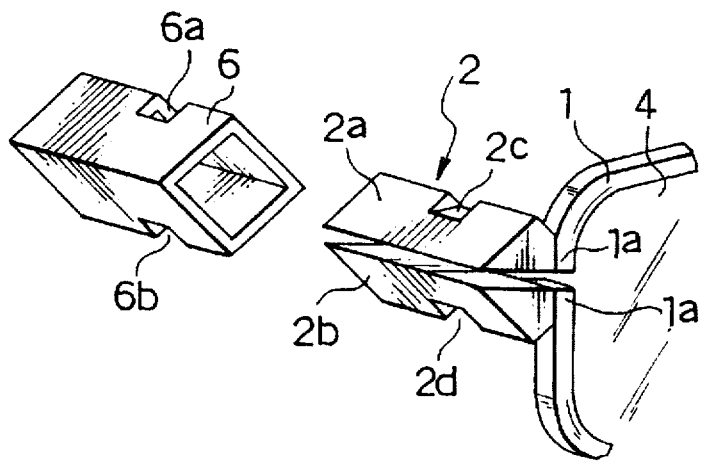
FIGS. 2a and 2b illustrate a coupling structure for coupling the split broach to an associated temple according to a second embodiment.
Figure 2B:
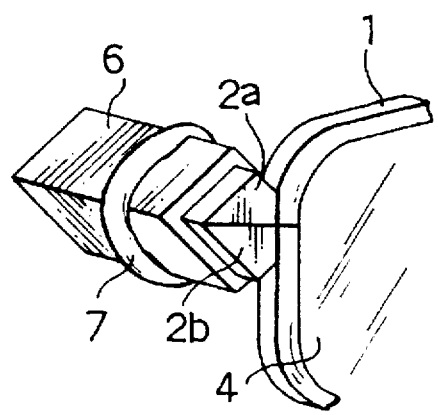
Figure 3:
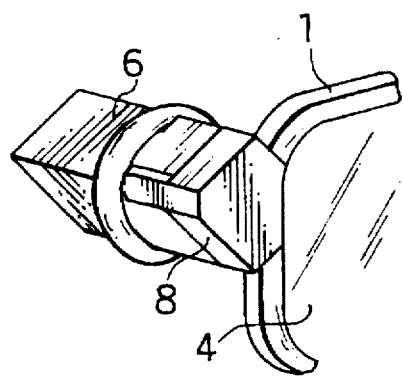
FIG. 3 illustrates another example of fixing band.

FIGS. 2 and 3 show a coupling structure according to the second embodiment, and same parts as in the first embodiment are indicated by the same reference numerals as used in FIG. 1. As shown, it uses a square, hollow copular member 6 and triangular broach sections 2a and 2b.

These triangular broach sections 2a and 2b are put on each other to provide a square block to be in conformity with the square hollow space of the coupler member 6, thus permitting the press-fitting of the broach sections 2a and 2b into the square hollow coupler member 6 in non-rotatable condition.

As shown from FIGS. 2a and 2b, the square coupler 6 has recesses 6a and 6b made on its opposite ridge lines, and likewise, each triangular broach section 2a or 2b has a recess 2c or 2d made on its ridge line. When these parts are telescoped, their recesses 6a, 6b and 2c, 2d are put in alignment, and then, a ring or band 7 is fitted in the so aligned recesses, thereby preventing the decoupling of these parts.

The band may be modified so as to cover the front end of the broach 2, as shown in FIG. 3.

Figure 4:
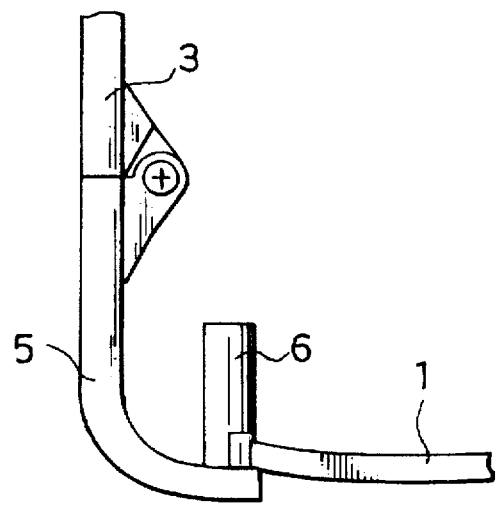
FIG. 4 is a plane view of a temple-and-rim combination with a broach modification according to a third embodiment.
Figure 5A:
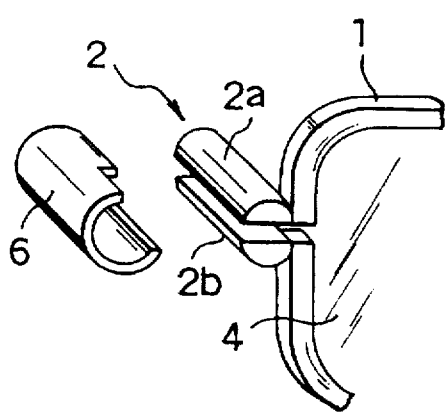
FIGS. 5a and 5b illustrate a coupling structure according to the third embodiment.
Figure 5B:
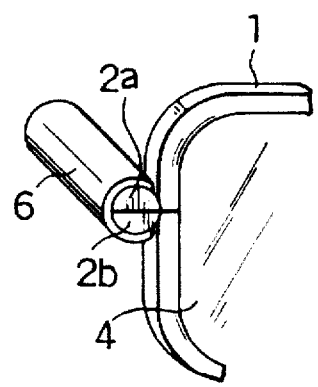
Figure 6:
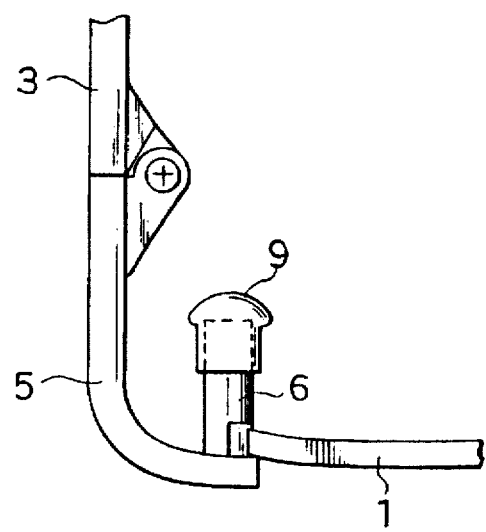
FIG. 6 is a plane view of a temple-and-rim combination with a broach modification having a fixing cap worn in the third embodiment.
Figures 7A, 7B:
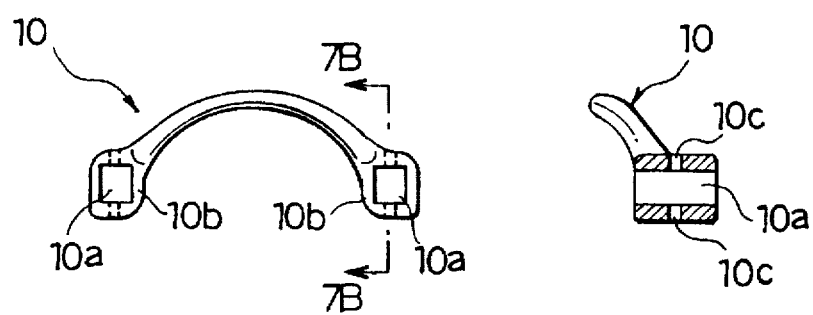
FIG. 7a is a front view of a bridge.
FIG. 7b is a cross section of the bridge taken along the line I—I.

FIGS. 4 to 6 show a coupling structure according to the third embodiment. Same parts as in the first and second embodiments are indicated by the same reference numerals as used in FIGS. 1 to 3, and only new parts are indicated by new reference numerals. FIG. 4 is a plane view of a fragment of eyeglasses showing a coupler member 6 attached to the end of the joint piece 5. The coupler member 6 has a "C"-shape in cross section to enclose the split broach 2.

As best seen from FIG. 5, the broach 2 is composed of upper and lower semicylindrical pieces 2a and 2b, which can squeeze the split rim 1 to joint its upper and lower halves tightly around the lens 4 when the "C"-shaped coupler member 6 is press-fitted on the split broach 2, as is the case with the first and second embodiments.

An extra cap 9 may be used to cover the rear end of the "C"-shaped coupler member 6, thereby preventing the expanding of the coupler member 6, as shown in FIG. 6.

FIGS. 7 to 11 show a coupling structure according to the fourth embodiment. Same parts as in the first, second and third embodiments are indicated by the same reference numerals as used in FIGS. 1 to 6, and only new parts are indicated by new reference numerals. It is designed for fixing a bridge 10 to adjoining rims 1. FIG. 7a is a front view of the bridge 10. As shown in the drawing, the bridge 10 has lateral holes 10a made on its opposite ends, and each end has two through holes 10c aligned on the line traversing the lateral hole 10a. A catch pin 11 is like a tuning fork, and is fixed to the rim 1. The catch pin 11 can be inserted in the lateral hole 10a for fixing the bridge 10 to the rim 1, and a releasing pin 12 can be inserted in each through hole 10c for removing the bridge 10 from the rim 1, as described below in detail.

Figure 8:
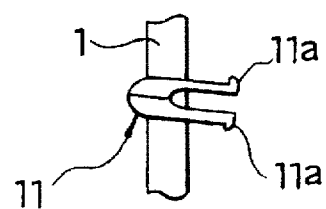
FIG. 8 illustrates a rim having a catch pin inserted in its lateral hole.
Figure 9:
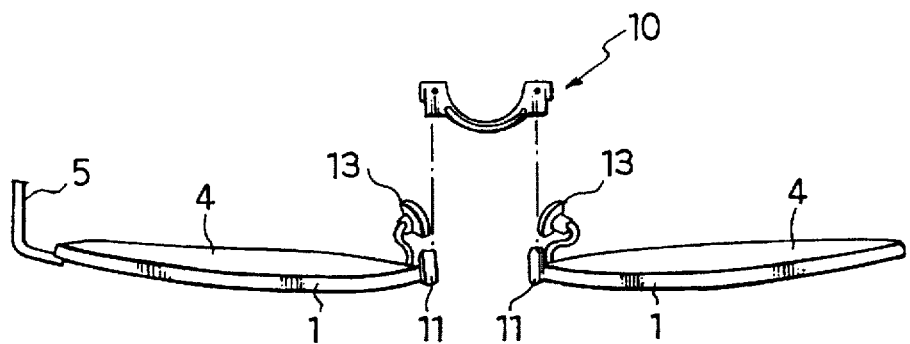
FIG. 9 illustrates how the bridge is fixed to the adjoining rims.
Figure 10:
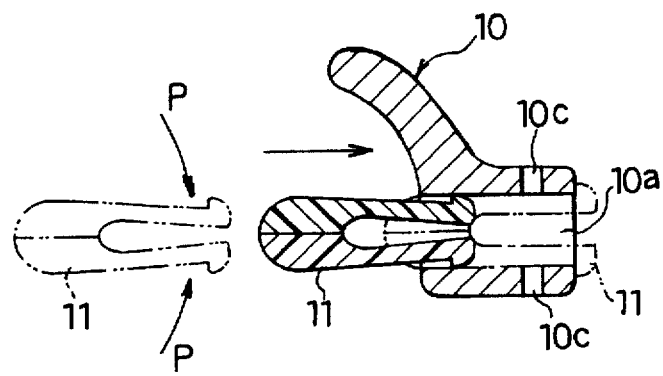
FIG. 10 illustrates how the catch pin can be attached to the rim.

Specifically, referring to FIGS. 8 and 9, each catch pin 11 is soldered to the inner side of the rim 1 in the vicinity of the nose pad 13. As seen from FIG. 8, each leg of the tuning fork-like pin has an engagement nail 11a formed on its end. Referring to FIG. 10, the tuning fork-like pin 11 is responsive to pressure P applied thereto for converging, and it is inserted in the lateral hole 10a, allowing it to expand in the lateral hole 10a with its engagement nails 11a caught by the circumference of the lateral hole 10a, thereby preventing the decoupling of the bridge 10 from the rim 1. Thus, one end of the bridge 10 is fixed to one of the opposite rims 1. Similarly, the other end of the bridge 10 is fixed to the other rim 1.

Figure 11:
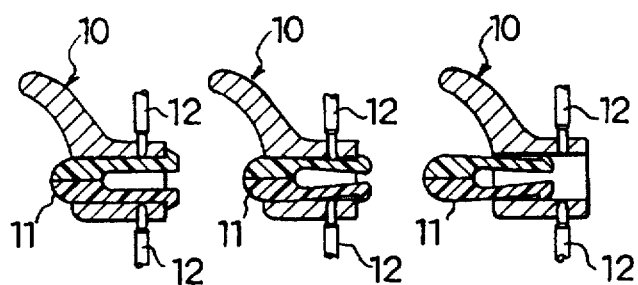
FIG. 11 illustrates how the catch pin can be removed from the rim.
Figure 12:
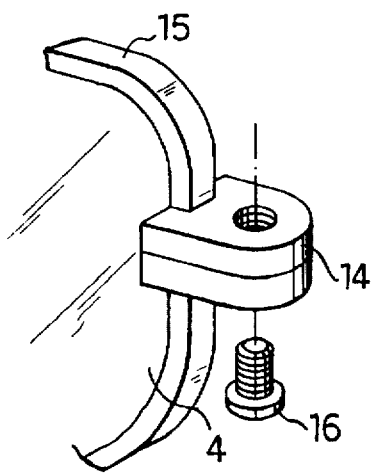
FIG. 12 shows a conventional coupling structure.

For changing the lenses 4 or disassembling and cleaning a pair of glasses the bridge 10 can be easily removed from the rims 1 simply by inserting two push pins 12 in the opposite through holes 10c, thereby causing the catch pin 11 to yieldingly converge, thus permitting it to leave the lateral hole 10a, as seen from FIG. 11.

The catch pins 11 may be fixed to the lateral holes 10a of the bridge 10 by adhering. The split broach 2 may be of pentagon, or may take any polygonal shape other than the square or circular cylinder as shown in the embodiments described above.

As may be understood from the above, an improved coupler structure according to the present invention permits the required coupling of selected parts, particularly rim-to-temple or rim-to-bridge connection without using screws, thus facilitating the assembling of parts to a pair of glasses, and at the same time, eliminating troubles and difficulties which would be caused by using screws in assembling.

The parts which are coupled by using the coupling structures according to the present invention are prevented from slipping off from each other by means of aligned recesses made in the parts and associated rings, and are prevented from rotating relative to each other by shaping the mating broach and joint piece in non-rotational shape. Thus, positive and reliable coupling is assured.

The bridge can be fixed to the rims with the aid of catch pins, and therefore, the required fixing can be effected simply by press-fitting the catch pins in the opposite lateral holes of the bridge without using screws. Accordingly the assembling efficiency can be improved.

A variety of temples can be fixed to the front of glasses although every temple must have a common coupler member 6 fixed to its joint piece. The simplicity of the coupling structure is advantageous to mass production, and the manufacturing cost is low.

I claim:

1. An eyeglasses parts coupling structure for fixing a lens to an associated rim and at the same time, the rim to the joint piece, to which one or the other temple is hinged, the rim having a loop hole at its outer side, thus dividing the rim circumference into upper and lower rim halves, and the rim having two broach sections fixed to the opposite ends of the upper and lower rim halves, and the joint piece having a hollow joint to permit the broach sections to be press-fitted therein, thereby holding the lens inside the rim.

2. An eyeglasses parts coupling structure according to claim 1 wherein the broach sections and/or the joint piece have anti-decoupling means in the form of slots or holes made on their circumferences in confronting relation, in which slots or holes ring means is press-fitted to joint together.

3. An eyeglasses parts coupling structure according to claim 1 wherein the broach sections and the joint piece are in such a form that their relative rotation may be prevented.

4. An eyeglasses parts coupling structure according to claim 1 wherein it further comprises two catch pins fixed to the inner sides of the adjoining rims for inserting into the lateral holes of the opposite ends of the bridge, thus detachably connecting the bridge to the adjoining rims.

5. An eyeglasses parts coupling structure according to claim 1 wherein each end of the bridge has two through holes aligned on the line traversing the lateral hole.

* * * * *